United States Patent
Siditsky et al.

(10) Patent No.: US 11,918,993 B2
(45) Date of Patent: Mar. 5, 2024

(54) ZERO EMISSION NESTED-LOOP REFORMING FOR HYDROGEN PRODUCTION

(71) Applicant: PURE SUSTAINABLE TECHNOLOGIES, LLC, Redondo Beach, CA (US)

(72) Inventors: Michael Evan Siditsky, Redondo Beach, CA (US); Kenneth Patrick Kelley, San Bernardino, CA (US)

(73) Assignee: PURE SUSTAINABLE TECHNOLOGIES, LLC, Laguna Niguel, CA (US)

( * ) Notice: Subject to any disclaimer, the term of this patent is extended or adjusted under 35 U.S.C. 154(b) by 193 days.

(21) Appl. No.: 17/248,230

(22) Filed: Jan. 14, 2021

(65) Prior Publication Data
US 2021/0213409 A1 Jul. 15, 2021

Related U.S. Application Data

(60) Provisional application No. 62/960,787, filed on Jan. 14, 2020.

(51) Int. Cl.
*B01J 8/26* (2006.01)
*B01J 8/02* (2006.01)
(Continued)

(52) U.S. Cl.
CPC .............. *B01J 8/26* (2013.01); *B01J 8/0278* (2013.01); *B01J 8/1827* (2013.01); *B01J 19/12* (2013.01);
(Continued)

(58) Field of Classification Search
CPC . B01J 8/26; B01J 8/0278; B01J 8/1827; B01J 19/12; B01J 2208/00752;
(Continued)

(56) References Cited

U.S. PATENT DOCUMENTS

| 3,615,300 A | 10/1971 | Holin et al. ............... C10J 3/16 48/206 |
| 2008/0145309 A1 | 6/2008 | Bavarian et al. ....... F27B 15/00 423/651 |

(Continued)

FOREIGN PATENT DOCUMENTS

| CN | 102730636 B | 1/2014 |
| CN | 104587912 B | 1/2017 |
| JP | 2000063295 A | 2/2000 |

OTHER PUBLICATIONS

Electrospun PVDF Nanofibers Decorated with Graphene and Titania for Improved Visible Light Photocatalytic Methanation of CO2.

*Primary Examiner* — Xiuyu Tai
(74) *Attorney, Agent, or Firm* — Adibi IP Group, PC; Amir V. Adibi; Andrew C. Palmer (57) ABSTRACT

Zero emission nested-loop (ZEN) reforming provides a scalable, eco-friendly process to produce high quality hydrogen at a relatively low operating cost. In one embodiment, a ZEN system comprises a reactor, a regenerator, and a photocatalytic reformer. During operation, the reactor receives a gas mixture and outputs hydrogen and catalyst adsorbed with carbon dioxide. The gas mixture is methane, steam, or hydrogen. Next, the regenerator receives the catalyst adsorbed with carbon dioxide and outputs carbon dioxide and desorbed catalyst. Next, the photocatalytic reformer receives carbon dioxide output by the regenerator and outputs methane and oxygen. The reactor receives at least some of the methane output by the photocatalytic reformer. By recycling methane in this way, the need for additional methane to fuel the system is reduced. The ZEN reforming system provides a novel technique to convert greenhouse gas emissions and carbon dioxide into oxygen and reusable methane gas.

15 Claims, 10 Drawing Sheets

(51) Int. Cl.
*B01J 8/18* (2006.01)
*B01J 19/12* (2006.01)
*C01B 3/44* (2006.01)
*C01B 3/56* (2006.01)
*C10L 3/10* (2006.01)

(52) U.S. Cl.
CPC ............. *C01B 3/44* (2013.01); *C01B 3/56* (2013.01); *C10L 3/103* (2013.01); *B01J 2208/00752* (2013.01); *B01J 2208/00761* (2013.01); *B01J 2219/0875* (2013.01); *B01J 2219/0892* (2013.01); *C01B 2203/0233* (2013.01); *C01B 2203/0425* (2013.01); *C01B 2203/043* (2013.01); *C01B 2203/0475* (2013.01); *C01B 2203/1241* (2013.01); *C01B 2203/1258* (2013.01); *C10L 2290/542* (2013.01)

(58) Field of Classification Search
CPC ...... B01J 2208/00761; B01J 2219/0875; B01J 2219/0892; B01J 27/04; B01J 19/127; B01J 35/0013; B01J 35/004; B01J 23/52; B01J 27/0573; B01J 27/0576; B01J 23/38; C01B 3/44; C01B 3/56; C01B 2203/0233; C01B 2203/0425; C01B 2203/043; C01B 2203/0475; C01B 2203/1241; C01B 2203/1258; C10L 3/103; C10L 2290/542; C10L 1/02; C12M 23/58; C12M 43/00; C12M 21/02; C12M 31/10; C02F 1/001; C02F 2303/16; C02F 1/52; C02F 103/18

See application file for complete search history.

(56) References Cited

U.S. PATENT DOCUMENTS

| | | | |
|---|---|---|---|
| 2011/0073809 A1 | 3/2011 | Faulkner | C01B 3/32 |
| | | | 252/373 |
| 2014/0000157 A1* | 1/2014 | O'Connor | C10L 1/02 |
| | | | 44/388 |
| 2014/0339072 A1* | 11/2014 | Jennings | B01J 27/04 |
| | | | 422/186.04 |
| 2020/0298214 A1* | 9/2020 | Khan | C25B 1/04 |
| 2021/0178378 A1* | 6/2021 | Khatiwada | H01M 14/005 |

* cited by examiner

ZERO EMISSION NESTED-LOOP REFORMING FOR HYDROGEN PRODUCTION

CROSS REFERENCE TO RELATED APPLICATIONS

This application claims the benefit under 35 U.S.C. § 119 from U.S. Provisional Patent Application Ser. No. 62/960,787, entitled "ZERO EMISSION NESTED-LOOP REFORMING FOR HYDROGEN PRODUCTION," filed on Jan. 14, 2020, the subject matter of which is incorporated herein by reference.

TECHNICAL FIELD

The present invention relates generally to the production of hydrogen, and more specifically, to the reforming of steam and methane to produce hydrogen.

BACKGROUND INFORMATION

Greenhouse gases (GHG), such as carbon dioxide ($CO_2$) and methane ($CH_4$), produced from human activities have been the most significant driver of observed climate change since the mid-20th century. Since 2005, GHG emissions have steadily increased in the United States. Recently, the three largest sources of GHG emissions in the United States are transportation, electricity generation, and industrial processes. These sources collectively constitute nearly 80% of the total 6.5 billion metric tons of GHG emissions generated in the United States in 2017. One way to lower the GHG emissions is to eliminate GHG emissions from hydrogen ($H_2$) generation. The global market for hydrogen generation is large and diverse. For example, the hydrogen production market is estimated at $135.5 billion in 2018 and is increasing at a rate of 8% with its primary technology, Steam Methane Reforming (SMR), contributing to roughly 95% of all hydrogen produced in the United States.

One major problem is that the current SMR technology emits approximately 150 million metric tons of $CO_2$ per year in the United States alone. This number is increasing at roughly 8% annually in step with the hydrogen production growth. One of the shortcomings of the current SMR technology is that there is no way to produce high purity hydrogen while producing zero $CO_2$ emissions. Another shortcoming is that there is no SMR technology that effectively recycles $CH_4$ emissions back into the SMR system for reuse. A solution to meet the growing $H_2$ demand and that overcomes these shortcomings is desired.

SUMMARY

A method and system for zero emission nested-loop (ZEN) reforming for hydrogen production is a scalable, eco-friendly process to produce high quality hydrogen at a relatively low operating cost. The system is capable of being integrated with electronics for automated operation. The ZEN reforming system includes a novel system for converting carbon dioxide to methane and oxygen (CDMO system), and a novel photocatalytic methanation system (PM system). The ZEN reforming system includes a fluidized reformer (reactor), a novel regenerator, and a novel photocatalytic reformer.

The ZEN reforming system is an improvement on the existing hydrogen reforming technology because the carbon dioxide that would be emitted currently by the regenerator is now fed to the photocatalytic reformer. The various configurations of the photocatalytic reformer allow for water or steam to be mixed with the carbon dioxide such that the resulting products are oxygen and methane. The methane is then recycled back to the reactor, thereby reducing the need for additional methane to be used to fuel the system. The ZEN reforming system provides a new way to convert a greenhouse gas emission, carbon dioxide, into oxygen and reusable methane gas.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
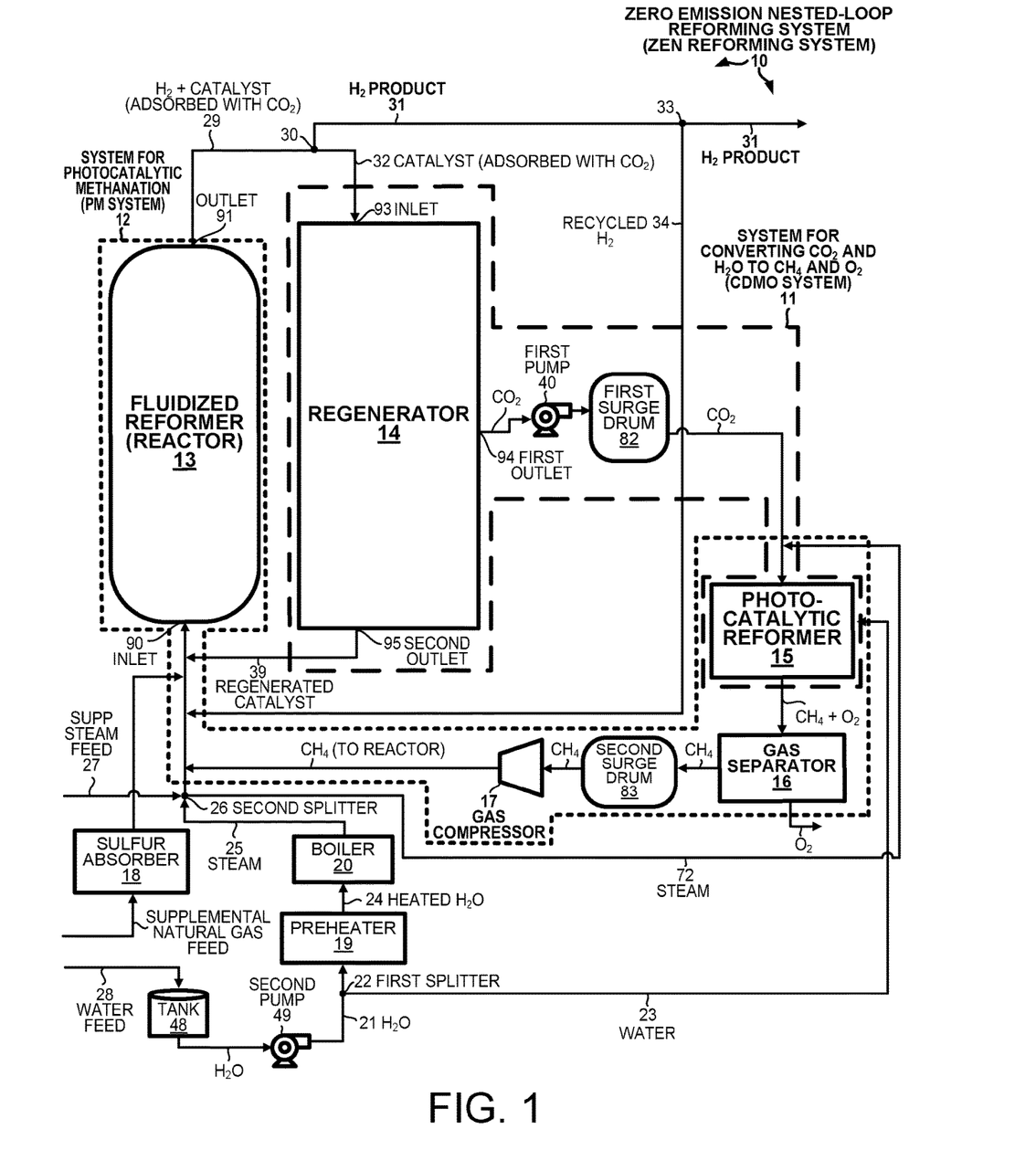
FIG. 1 is a diagram of a system for Zero Emission Nested-loop reforming for hydrogen production (ZEN reforming system) 10.

FIG. 1 is a diagram of a system for Zero Emission Nested-loop reforming for hydrogen production (ZEN reforming system) 10. In this example, the ZEN reforming system 10 includes a system for converting carbon dioxide to methane and oxygen (CDMO) system 11 and a photocatalytic methanation (PM) system 12.

The ZEN reforming system 10 includes a reactor 13, a regenerator 14, and a photocatalytic reformer (PCR) 15. In the example shown in FIG. 1, the reactor 13 is a fluidized reformer having an inlet 90 and an outlet 91. The regenerator 14 has an inlet 93, a first outlet 94, and a second outlet 95. The PCR 15 has at least one inlet and at least one outlet.

FIG. 1 shows the ZEN reforming system 10 including a gas separator 16, a gas compressor 17, a first pump 40, a first surge drum 82, a second surge drum 83. In this example, the gas separator 16 has an inlet, a first outlet, and a second outlet, the gas compressor 17 has an inlet and an outlet, the first pump 40 has an inlet and an outlet, the first surge drum 82 has an inlet and an outlet, and the second surge drum 83 has an inlet and an outlet.

Additionally, FIG. 1 shows system 10 including a sulfur absorber 18. In this example, natural gas (sulfurized methane, $CH_4$) is obtained from a source outside of the ZEN reforming system 10 (e.g., supplemental natural gas feed) and is fed to an inlet of the sulfur absorber 18. The sulfur absorber 18 desulfurizes the methane and outputs desulfurized methane to be sent to the inlet 90 of the reactor 13. The desulfurization of natural gas prevents long term catalyst deactivation.

In another example, the ZEN reforming system 10 does not include the sulfur absorber 18 because desulfurized methane is obtained from an external source and is sent directly to the reactor 13. In yet another example, the ZEN reforming system 10 does not require any supplemental natural gas or the sulfur absorber 18 because the methane generated from the PCR 15 is received by the reactor 13.

Furthermore, the ZEN reforming system 10 includes a preheater 19 having an inlet and an outlet, a boiler 20 having an inlet and an outlet, a tank 48, a second pump 49, and at least one heating vessel to generate steam from water. In another embodiment the ZEN reforming system 10 does not include tank 48 and second pump 49 because water is pumped from a source outside of the ZEN reforming system 10.

During operation of system 10, water is fed (via stream 28) into the tank 48 and is expelled to the second pump 49. The second pump 49 sends water (via stream 21) to a first splitter 22. Some of the water exits the first splitter 22 and continues to the inlet of the preheater 19 and the remaining water is sent (via stream 23) to the at least one inlet of the PCR 15. The preheater 19 heats the water and expels heated water (Heated $H_2O$) that is sent (via stream 24) to the inlet of the boiler 20. The boiler 20 heats the heated water and expels steam through the outlet, which is sent (via stream 25) to a second splitter 26. Some of the steam exits the second splitter 26 and continues to the inlet 90 of the reactor 13 and the remaining steam is sent (via stream 72) to the at least one inlet of the PCR 15.

In another embodiment, system 10 does not include the first splitter 22 and the PCR 15 receives steam generated by the boiler 20 or an external source.

In yet another embodiment, system 10 does not include preheater 19 because water can be sent to the inlet of the boiler 20 to be heated into steam that is sent to the reactor 13.

In yet another embodiment, system 10 does not include the at least one heating vessel (the preheater 19 and the boiler 20) and the second splitter 26 because steam is obtained from an external source (e.g. steam feed via stream 27).

Reactor 13 contains an amount of steam methane reforming catalyst, 0.5-10% Magnesium Oxide (MgO), 5-15% Nickel Oxide (NiO), 0-5% $K_2O$ disposed on an alpha alumina (e.g. $Al_2O_3$) support. In another example, the steam methane reforming catalyst contains Zeolite Imidazolate Frameworks (ZIF)-8 or a porous ceramic support doped with either 15-60% nickel (Ni), 0.5-5% platinum, 0.5-5% ruthenium or 0.5-5% rhodium. The particle size allows for more fluidization while reducing aggregation issues.

A ratio of at least 3 to 1 of steam to methane is used to ensure the reactions generate hydrogen ($H_2$) and carbon dioxide ($CO_2$) products. A ratio lower than 3 to 1 is possible, but will produce more carbon monoxide (CO). One novel aspect is that only two reactions are required to convert steam and methane to carbon dioxide and hydrogen within the reactor 13:

1) Reforming Rxn: $H_2O+CH_4 \rightarrow CO+3H_2$
2) Water Gas Shift Rxn: $CO+H_2O \rightarrow CO_2+H_2$
Overall Reaction: $2H_2O+CH_4 \rightarrow CO_2+4H_2$ After the reforming and water gas shift reactions occur, an amount of the steam methane reforming catalyst adsorbs some of the carbon dioxide particles within the reactor 13. The reactor 13 expels a mixture of hydrogen and the steam methane reforming catalyst adsorbed with carbon dioxide through the outlet 91 the reactor 13. The mixture is sent (via stream 29) to a third splitter 30. Hydrogen product exits one end of the third splitter 30 (via stream 31) and the steam methane reforming catalyst absorbed with carbon dioxide exits another end of third splitter 30 (via stream 32). An amount of the hydrogen product enters a fourth splitter 33 and is sent (via stream 34) to the inlet 90 of the reactor 13 as "recycled hydrogen" for further purification. In another embodiment, the ZEN reforming system 10 does not include the fourth splitter 33.

During operation, the steam methane reforming catalyst adsorbed with carbon dioxide (stream 32) is received into the inlet 93 the regenerator 14. In one example, the regenerator 14 is a state-of-the-art regenerator. In the example shown in FIG. 1, the novel regenerator 14 desorbs the carbon dioxide from the catalyst and outputs carbon dioxide via the first outlet 94 and outputs the desorbed catalyst (regenerated catalyst) through the second outlet 95 that is sent (via stream 39) to the inlet 90 of the reactor 13. In the example shown in FIG. 1, the first pump 40 is a vacuum pump that operates at vacuum pressure (<0 psig). The carbon dioxide that exits the first outlet 94 of the regenerator 14 enters the inlet of the first pump 40. Then, carbon dioxide is expelled through the outlet of the first pump 40 into the inlet of the first surge drum 82. Next, carbon dioxide exits the outlet of the first surge drum 82 and is received by the at least one inlet of the PCR 15. In another embodiment, the first pump 40 is part of the novel regenerator 14.

FIG. 1 shows that the inlet of the gas separator 16 receives a mixture of methane and oxygen output by the PCR 15. The gas separator 16 separates the methane and oxygen and expels oxygen via the first outlet and methane via the second outlet. This process prevents oxygen from entering into the reactor 13, thereby reducing potential explosions from the introduction of oxygen to the reactor 13. Furthermore, the gas separator 16 prevents a buildup of the oxygen in the system and generates oxygen for external use.

FIG. 1 shows that the inlet of the gas compressor 17 receives methane output by the gas separator 16 through the second surge drum 83. Notably, the first surge drum 82 and the second surge drum 83 help control the flow between components of the ZEN reforming system 10. The gas compressor 17 compresses the methane to a pressure that is greater than the pressure of the steam in stream 25.

In another example, the gas compressor 17 expels methane and oxygen via the outlet and is received via the inlet of gas separator 16. In yet another example, system 10 does not include gas compressor 17 and methane exiting the gas separator 16 is received by the reactor 13 (via the second surge drum 83) without the need of gas compressor 17.

FIG. 1 shows a novel system for converting carbon dioxide to methane and oxygen (CDMO system) 11. The CDMO system 11 includes the regenerator 14, the first pump 40, and the PCR 15. The CDMO system 11 converts carbon dioxide generated by the regenerator 14 into methane and oxygen using the photocatalytic reformer 15. The CDMO system 11 is a subsystem of the ZEN reforming system 10 but can also be a standalone system. Surge drum 82 is not required when system 11 operates as a standalone system. Notably, the regenerator 14 of the CDMO system 11 can be a state-of-the-art regenerator, the novel regenerator 14 shown in FIG. 2, or another regenerator.

FIG. 1 shows a novel system for photocatalytic methanation (PM system) 12. The PM system 12 includes the PCR 15, the gas separator 16, the gas compressor 17, and the reactor 13. In one example, the PCR 15 converts carbon dioxide and water into methane and oxygen. In another example, the PCR 15 converts carbon dioxide and steam into methane and oxygen. The methane that is produced by the PCR 15 is recycled back to the reactor 13. The PM system 12 is a subsystem of the ZEN reforming system 10 but can also be a standalone system. Surge drum 83 is not required when system 12 operates as a standalone system.

Figure 2:
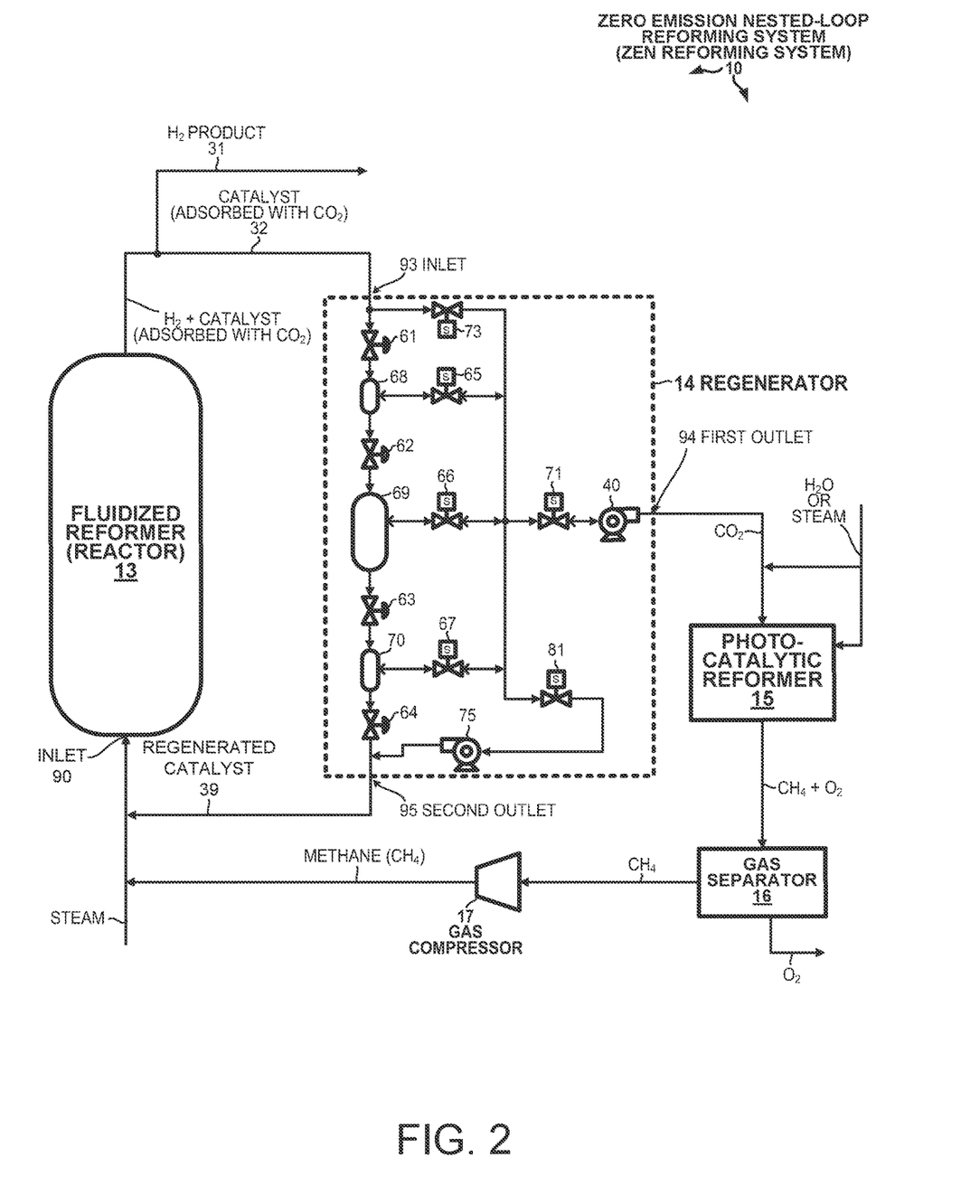
FIG. 2 is a diagram showing an example operation of the novel ZEN reforming system 10 (and CDMO system 11), with a novel regenerator 14.

FIG. 2 is a diagram showing an example operation of the novel ZEN reforming system 10 (and CDMO system 11), with the novel regenerator 14. FIG. 2 shows the first pump 40 as part of the regenerator 14. In this example, inlet of the reactor 13 receives steam, methane, and steam methane reforming catalyst (regenerated catalyst). A mixture of hydrogen and catalyst adsorbed with carbon dioxide exit the reactor 13. The hydrogen is extracted (via stream 31) from this mixture as hydrogen product. The catalyst adsorbed with carbon dioxide is sent (via stream 32) into the inlet 93 of the regenerator 14.

In one novel aspect, the regenerator 14 includes a plurality of chambers and a plurality of valves. A first of the plurality of valves 61 regulates the flowrate of stream 32 (steam methane catalyst adsorbed with $CO_2$) that is fed into a first of the plurality of chambers (top equalizer) 68. A second of the plurality of valves 62 regulates the flowrate between the first of the plurality of chambers (top equalizer) 68 and a second of the plurality of chambers (regenerator chamber) 69. A third of the plurality of valves 63 regulates the flowrate between the second of the plurality of chambers (regenerator chamber) 69 and a third of the plurality of chambers (bottom equalizer) 70. A fourth of the plurality of valves 64 regulates the flowrate of stream 39 (regenerated catalyst) that is expelled via the second outlet 95 of the regenerator 14. A fifth of the plurality of valves 65 is a solenoid valve that regulates the pressure in the first of the plurality of chambers (top equalizer) 68. A sixth of the plurality of valves 66 is a solenoid valve that regulates the pressure in the second of the plurality of chambers (regenerator chamber) 69. A seventh of the plurality of valves 67 is a solenoid valve that regulates the pressure in the third of the plurality of chambers (bottom equalizer) 70. An eighth of the plurality of valves 71 is a solenoid valve that regulates the flowrate of $CO_2$ that is sent to an inlet of the first pump 40 and pumped via the outlet of the first pump 40 through the first outlet 94 of the regenerator 14. A ninth of the plurality of valves 81 is a solenoid valve that helps stabilize pressure in the regeneration process by regulating the flowrate of material that flows to a third pump 75. A tenth of the plurality of valves 73 is a solenoid valve that helps regulate the flowrate of material entering through the inlet 93 of the regenerator 14. In another embodiment, the regenerator 14 has a different number of chambers, valves, and pumps.

FIG. 2 shows the novel regenerator 14 with the first, second, and third of the plurality of chambers. The first of the plurality of chambers (top equalizer) 68 equalizes the pressure between 68 and the second of the plurality of chambers (regenerator chamber) 69 to prevent valve hammering. The first pump 40 desorbs the $CO_2$ gas from the catalyst that is contained within the second of the plurality of chambers (regenerator chamber) 69. The third of the plurality of chambers (bottom equalizer) 70 equalizes the pressure from the regenerator chamber 69 before the regenerated catalyst is sent to the inlet 90 of the reactor 13.

Figure 3:
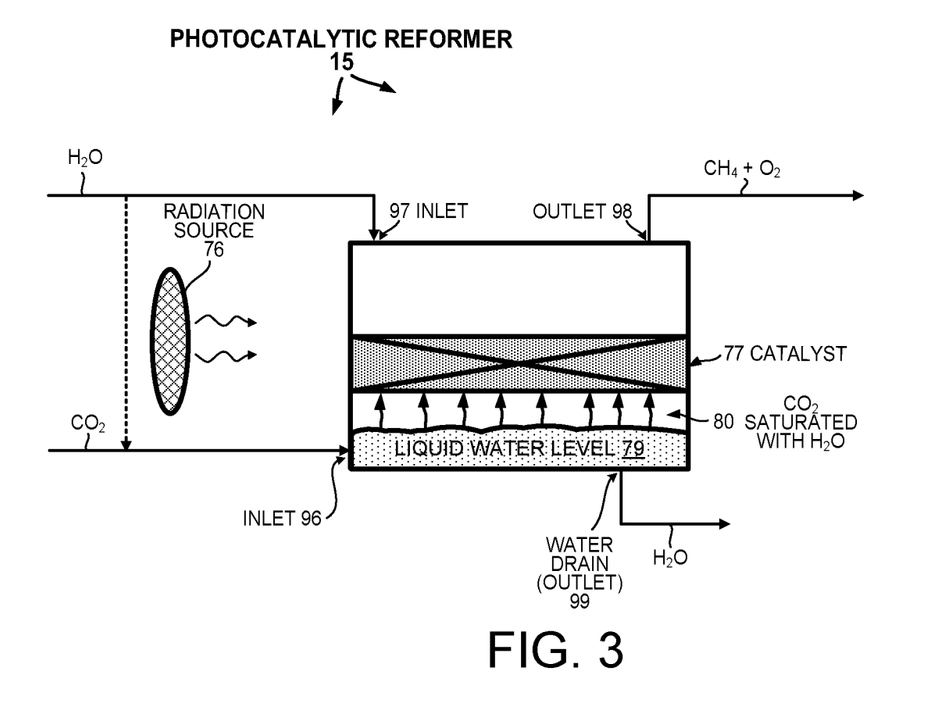
FIG. 3 is a diagram showing an example of a photocatalytic reformer 15.

FIG. 3 is a diagram showing an example of the photocatalytic reformer 15. In this example, the photocatalytic reformer 15 includes at least one inlet (inlet 96 and inlet 97), an outlet 98, an outlet 99, a radiation source 76, and catalyst 77. Water is fed into inlet 97. As the water fills the PCR 15, a liquid water level 79 forms. Carbon dioxide is fed into inlet 96, travels through the liquid water level 79, and becomes saturated with water 80.

In another example, inlet 97 is not required because water is mixed with carbon dioxide and the carbon dioxide water mixture enters via inlet 96.

The main reaction to convert water and carbon dioxide to methane and oxygen occurs within the photocatalytic reformer 15 is as follows:

Reforming Reaction: $2H_2O+CO_2 \rightarrow CH_4+2O_2$

The scope of the present invention should not be limited to the above-mentioned equation illustrating the conversion of water and carbon dioxide to methane and oxygen. The role of the catalyst is to accept and transfer the electrons between the carbon dioxide and water after they are radiated. The photocatalytic reformer 15 expels a mixture of methane and oxygen via the outlet of the photocatalytic reformer 15.

The PCR 15 of FIG. 3 can be implemented in the ZEN reforming system 10 of FIGS. 1 and 2. For example, carbon dioxide expelled from the first outlet 94 of the regenerator 14 is received by inlet 96 of the PCR 15.

Figure 4:
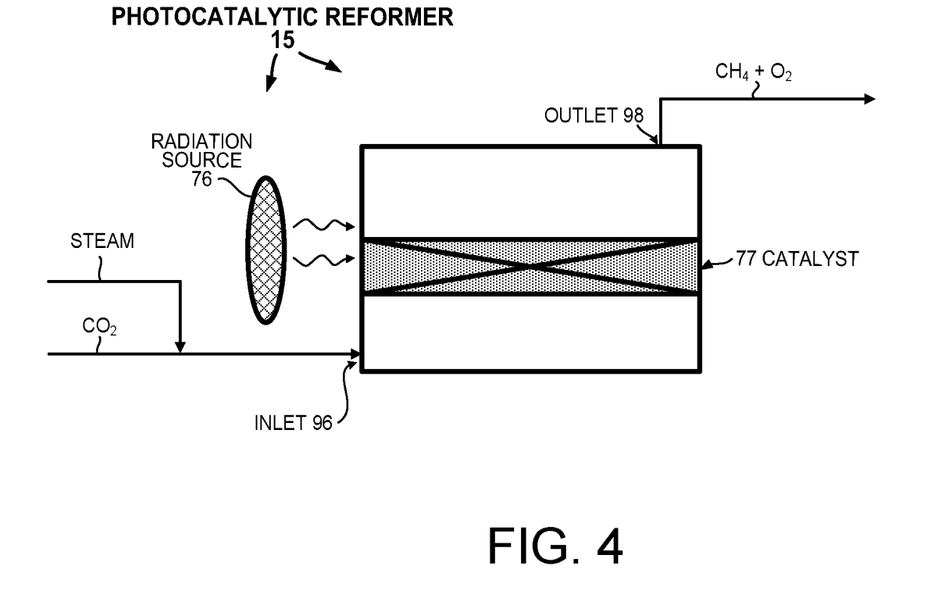
FIG. 4 is a diagram showing an example of the photocatalytic reformer 15.

FIG. 4 is a diagram showing another example of the photocatalytic reformer 15. In this example, the photocatalytic reformer 15 includes at least one inlet (inlet 96), outlet 98, radiation source 76, and catalyst 77. A mixture of steam and carbon dioxide is fed into inlet 96.

The main reaction to convert steam and carbon dioxide to methane and oxygen occurs within the photocatalytic reformer 15 is as follows:

Reforming Reaction: $2H_2O+CO_2 \rightarrow CH_4+2O_2$

The scope of the present invention should not be limited to the above-mentioned equation illustrating the conversion of steam and carbon dioxide to methane and oxygen. The role of the catalyst is to accept and transfer the electrons between the carbon dioxide and steam after they are radiated. The photocatalytic reformer 15 expels a mixture of methane and oxygen via the outlet of the photocatalytic reformer 15.

The PCR 15 of FIG. 4 can be implemented in the ZEN reforming system 10 of FIGS. 1 and 2. For example, steam generated from the boiler 20 of FIG. 1 is received by the inlet 96 of the PCR 15. In FIG. 2, steam generated from an external source can be received by inlet 97 of the PCR 15.

Figure 5:
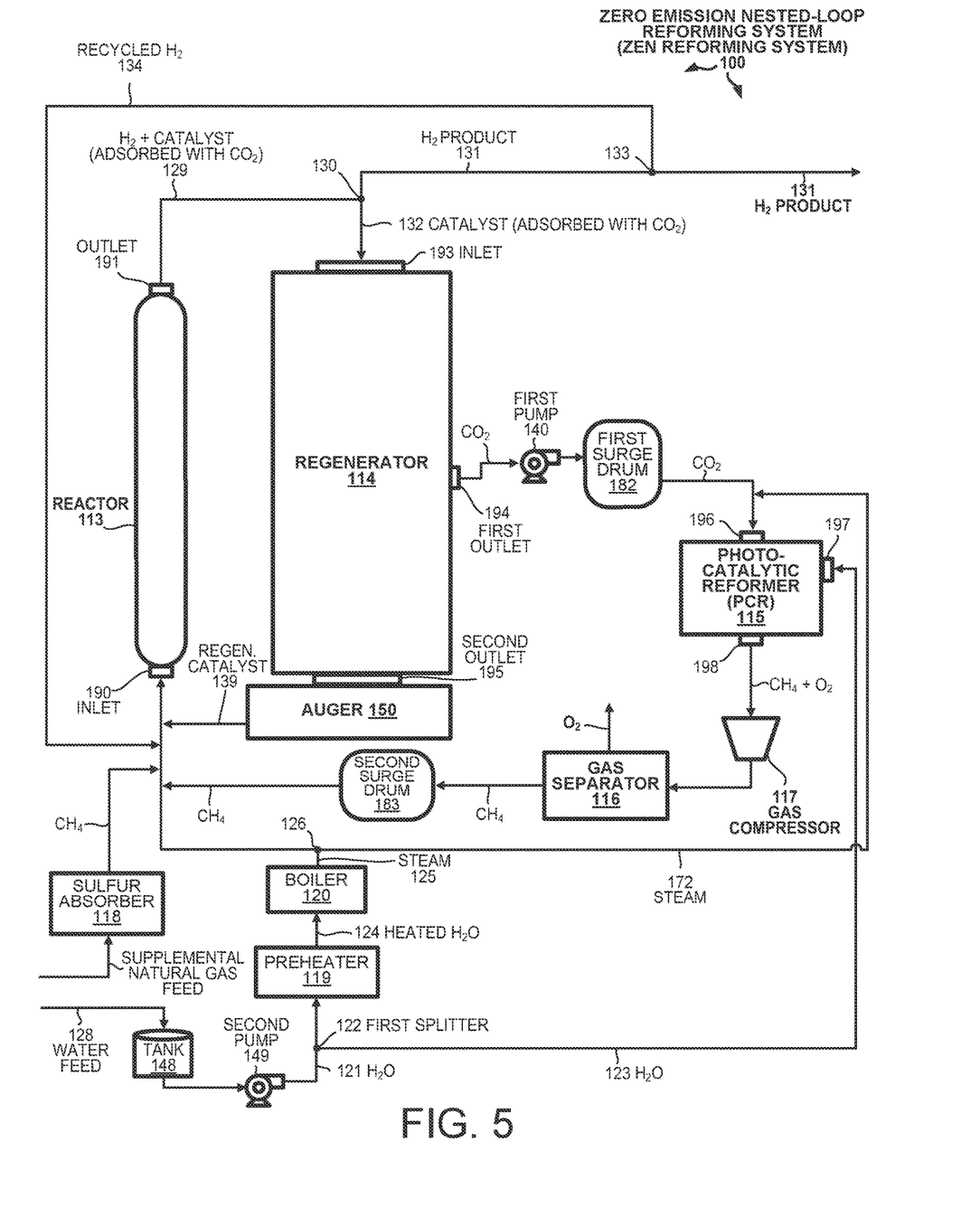
FIG. 5 is a diagram of a system for Zero Emission Nested-loop reforming for hydrogen production (ZEN reforming system) 100.

FIG. 5 is a diagram of a system for Zero Emission Nested-loop reforming for hydrogen production (ZEN reforming system) 100. In this example, the ZEN reforming system 100 includes a system for converting carbon dioxide to methane and oxygen (CDMO) system and a photocatalytic methanation (PM) system.

The ZEN reforming system 100 includes a reactor 113, a regenerator 114, and a photocatalytic reformer (PCR) 115. In the example shown in FIG. 5, the reactor 113 is a fluidized reformer having an inlet 190 and an outlet 191. In another example, the reactor 113 is a riser (pipe). The regenerator 114 has an inlet 193, a first outlet 194, and a second outlet 195. The PCR 115 has at least one inlet and at least one outlet.

FIG. 5 shows the ZEN reforming system 100 including a gas separator 116, a gas compressor 117, a first pump 140, a first surge drum 182, and second surge drum 185. In this example, the gas separator 116 has an inlet, a first outlet, and a second outlet, the gas compressor 117 has an inlet and an outlet, the first pump 140 has an inlet and an outlet, the first surge drum 182 has an inlet and an outlet, and the second surge drum 183 has an inlet and an outlet.

The first surge drum 182 and the second surge drum 183 help control the flow between components of the ZEN reforming system 100. For example, surge drum 182 assists by controlling the flowrate of carbon dioxide entering into the PCR 115. Surge drum 183 helps control flowrate of the methane to the reactor 113.

FIG. 5 shows system 100 including a sulfur absorber 118. In this example, natural gas (sulfurized methane, $CH_4$) is obtained from a source outside of the ZEN reforming system 100 (e.g., supplemental natural gas feed) and is fed to an inlet of the sulfur absorber 118. The sulfur absorber 118 desulfurizes the methane and outputs desulfurized methane to be sent to the inlet 190 of the reactor 113. The desulfurization of natural gas prevents long term catalyst deactivation.

In another example, the ZEN reforming system 100 does not include the sulfur absorber 118 because desulfurized methane is obtained from an external source and is sent directly to the reactor 113.

In yet another example, the ZEN reforming system 100 does not require any supplemental natural gas or the sulfur absorber 118 because the PCR 115 is able to generate methane to recycle to reactor 113 such that steam methane reforming can occur.

Furthermore, the ZEN reforming system 100 includes a preheater 119 having an inlet and an outlet, a boiler 120 having an inlet and an outlet, a tank 148, a second pump 149, and at least one heating vessel to generate steam from water. In another embodiment the ZEN reforming system 100 does not include tank 148 and second pump 149 because water is pumped from a source outside of the ZEN reforming system 100.

During operation of system 100, water is fed (via stream 128) into the tank 148 and is expelled to the second pump 149. The second pump 149 sends water (via stream 121) to a first splitter 122. Some of the water exits the first splitter 122 and continues to the inlet of the preheater 119 and the remaining water is sent (via stream 123) to the at least one inlet of the PCR 115 (e.g. inlet 196 or inlet 197). The preheater 119 heats the water and expels heated water (Heated $H_2O$) that is sent (via stream 124) to the inlet of the boiler 120. The boiler 120 heats the heated water and expels steam through the outlet that is sent (via stream 125) to a second splitter 126. Some of the steam exits the second splitter 126 and continues to the inlet 190 of the reactor 113 and the remaining steam is sent (via stream 172) to the at least one inlet of the PCR 115 (e.g. inlet 196 or inlet 197).

In another embodiment, system 100 does not include the first splitter 122 and the PCR 115 receives steam generated by the boiler 120 or an external source.

In yet another embodiment, system 100 does not include preheater 119 because water can be sent to the inlet of the boiler 120 to be heated into steam that is sent to the reactor 113.

In yet another embodiment, system 100 does not include the at least one heating vessel (the preheater 119 and the boiler 120) and the second splitter 126 because steam is obtained from an external source.

Reactor 113 contains an amount of steam methane reforming catalyst, 0.5-10% Magnesium Oxide (MgO), 5-15% Nickel Oxide (NiO), 0-5% $K_2O$ disposed on an alpha alumina (e.g. $Al_2O_3$) support. In another example, the steam methane reforming catalyst contains Zeolite Imidazolate Frameworks (ZIF)-8 or a porous ceramic support doped with either 15-60% nickel (Ni), 0.5-5% platinum, 0.5-5% ruthenium or 0.5-5% rhodium. The particle size allows for more fluidization while reducing aggregation issues.

A ratio of at least 3 to 1 steam to methane is used to ensure the reactions generate hydrogen ($H_2$) and carbon dioxide ($CO_2$) products. A ratio lower than 3 to 1 is possible, but will produce more carbon monoxide (CO). One novel aspect is that only two reactions are required to convert steam and methane to carbon dioxide and hydrogen within the reactor 113:

1) Reforming Rxn: $H_2O+CH_4 \rightarrow CO+3H_2$
2) Water Gas Shift Rxn: $CO+H_2O \rightarrow CO_2+H_2$
Overall Reaction: $2H_2O+CH_4 \rightarrow CO_2+4H_2$ After the reforming and water gas shift reactions occur, an amount of the steam methane reforming catalyst adsorbs some of the carbon dioxide particles within the reactor 113. The reactor 113 expels a mixture of hydrogen and the steam methane reforming catalyst adsorbed with carbon dioxide through outlet 191. The mixture is sent (via stream 129) to a third splitter 130. In this example, the third splitter 130 is an offset reducer which helps direct particles and adsorbed gas through one end to the inlet 193 of the regenerator 114 while allowing hydrogen gas to exit through another end. In system 100, hydrogen gas exits one end of the third splitter 130 (via stream 131) and the steam methane reforming catalyst absorbed with carbon dioxide exits another end of third splitter 130 (via stream 132). An amount of the hydrogen product enters a fourth splitter 133 and is sent (via stream 134) to the inlet 190 of the reactor 113 as "recycled hydrogen" for further purification. In another embodiment, the ZEN reforming system 100 does not include the fourth splitter 133.

During operation, the steam methane reforming catalyst adsorbed with carbon dioxide (stream 132) is received into the inlet 193 of the regenerator 114. In one example, the regenerator 114 is a state-of-the-art regenerator. In the example shown in FIG. 5, the novel regenerator 114 desorbs the carbon dioxide from the catalyst and outputs carbon dioxide via the first outlet 194 and outputs the desorbed catalyst (regenerated catalyst) through the second outlet 195 into an auger 150. In this example, the auger 150 uses screw conveyor operation to move the regenerated catalyst from the regenerator 114 to the reactor 113. The auger 150 helps provide a continuous flow of regenerated catalyst to the reactor 113. Additionally, the auger 150 has another outlet (not shown in FIG. 5) which allows for removal of catalyst from the system 100.

In the example shown in FIG. 5, the first pump 140 is a vacuum pump that operates at vacuum pressure (<0 psig). The carbon dioxide that exits the first outlet 194 of the regenerator 114 enters the inlet of the first pump 140. Then, carbon dioxide is expelled through the outlet of the first pump 140 into the inlet of the first surge drum 182. Next, carbon dioxide exits the outlet of the first surge drum 182 and is received by the at least one inlet of the PCR 115. In another embodiment, the first pump 140 is part of the regenerator 114.

FIG. 5 shows that the inlet of the gas compressor 117 receives a mixture of methane and oxygen output by the PCR 115. The gas compressor 117 compresses the mixture and expels the compressed mixture via the outlet. The gas separator 116 separates the methane and oxygen and expels oxygen via the first outlet and methane via the second outlet. This process prevents oxygen from entering into the reactor 113, thereby reducing potential explosions from the introduction of oxygen into the reactor 113. Furthermore, the gas separator 116 prevents a buildup of the oxygen in the system and generates oxygen for external use. The second surge drum 183 receives methane output by the gas separator 116 and helps control the flow rate of methane recycled into the reactor 113.

In another example, the gas separator 116 expels methane via the first outlet and is received via the inlet of gas compressor 117. In yet another example, system 100 does not include gas compressor 117 and methane exiting the gas separator 116 is received by the reactor 113 (via the second surge drum 183).

Figure 6:
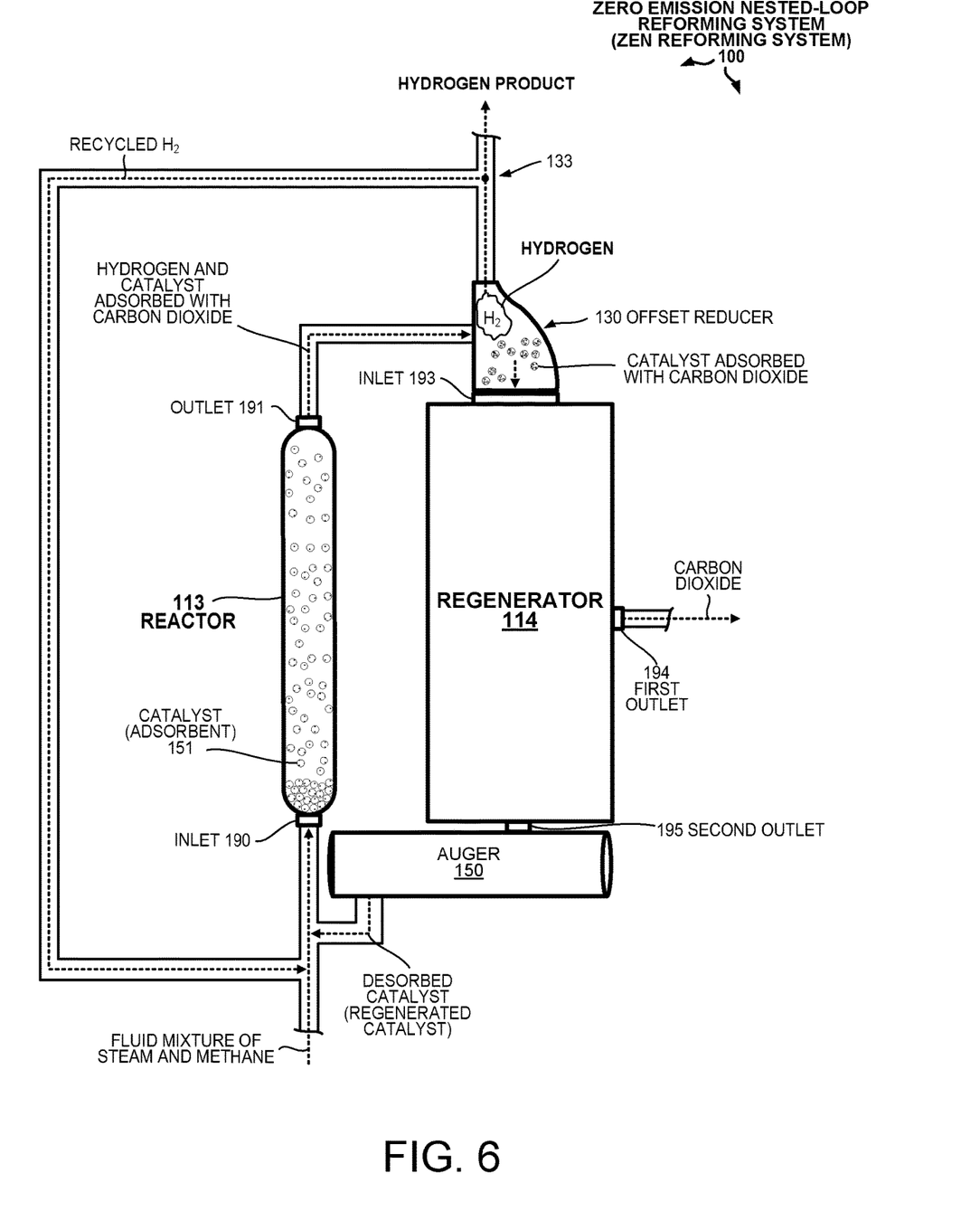
FIG. 6 is a diagram showing an example operation of the ZEN reforming system 100.

FIG. 6 is a diagram showing an example operation of the ZEN reforming system 100. During operation, a fluid mixture of steam and methane are fed into reactor 113 via inlet 190. The mixture fluidizes the solid catalyst (absorbent) 151 within the reactor 113. The steam methane reforming reaction takes place at active sites on the catalyst 151 surface while the catalyst 151 travels from the inlet 190 towards the outlet 191.

FIG. 6 shows that the outlet 191 of reactor 113 is coupled to the inlet 193 of regenerator 114 via the offset reducer (splitter) 130. Hydrogen and catalyst adsorbed with carbon dioxide exit the reactor via outlet 191 and enter the offset reducer 130. Hydrogen gas exits one end of the offset reducer 130 and exits the system 100 as product. In the example shown in FIG. 6, the hydrogen enters splitter 133 such that some of the hydrogen is recycled back to the reactor 113 for further purification.

Catalyst adsorbed with carbon dioxide exits another end of the offset reducer 130 and enters inlet 193 of the regenerator 114. The carbon dioxide is desorbed from the catalyst in the regenerator 114. More information regarding the regenerator 114 will be described in detail below. The carbon dioxide exits the regenerator 114 via the first outlet 194, and the catalyst exits the regenerator via the second outlet 195.

FIG. 6 shows the second outlet 195 of the regenerator 114 coupled to the inlet 190 of the reactor 113 via auger 150. The auger 150 helps control the regenerator valve cycling and desorption time while ensuring a continuous flow of catalyst through the reactor 113. In this example, the auger 150 moves recycled (regenerated) catalyst from outlet 195 of the regenerator 114 to inlet 190 of the reactor 113. In another example, reactor 113 has another inlet which auger 150 feeds directly into. In yet another example, auger 150 is not included in system 100.

Figure 7:
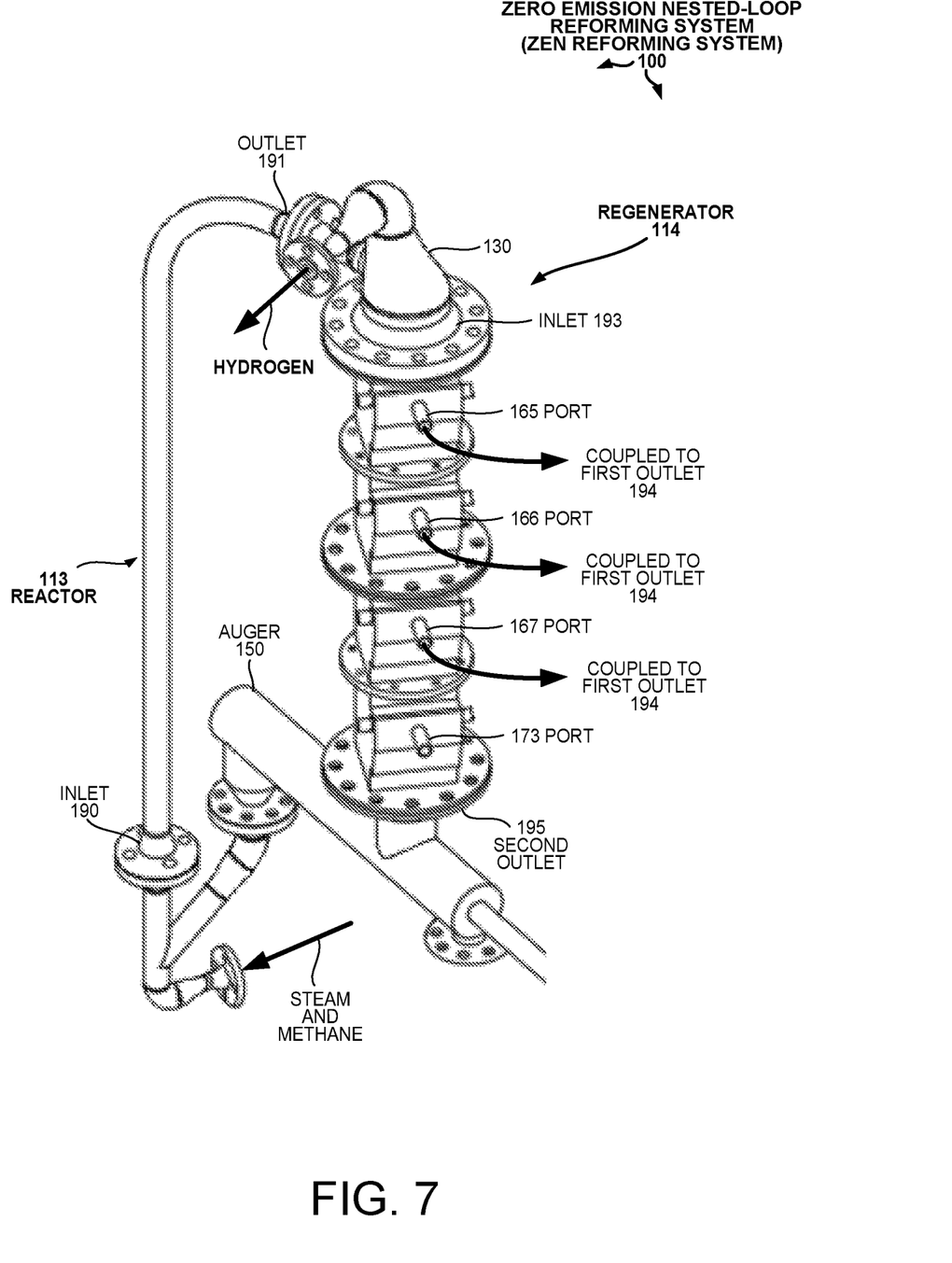
FIG. 7 is a perspective view of the ZEN reforming system 100.

FIG. 7 is a perspective view of the ZEN reforming system 100. FIG. 7 shows an exemplary arrangement of the components of system 100. In this example, reactor 113 is a riser with inlet 190 and outlet 191. Outlet 191 of the reactor 113 coupled to inlet 193 of the regenerator 114 via the offset reducer 130.

The regenerator 114 of FIG. 7 comprises two double flap valves each having two ports. The first double flap valve is coupled to the first outlet 194 of the regenerator 114 via ports 165 and 166. The second double flap valve is coupled to the first outlet 194 of the regenerator 114 via port 167. The second double flap valve includes port 173 which is not coupled to the first outlet 194 of the regenerator 114. In one example, the top of the first double flap valve serves as the inlet 193 of regenerator 114. In this example the bottom of the second double flap valve serves as the second outlet 195 of regenerator 114 and is coupled to the auger 150.

Figure 8:
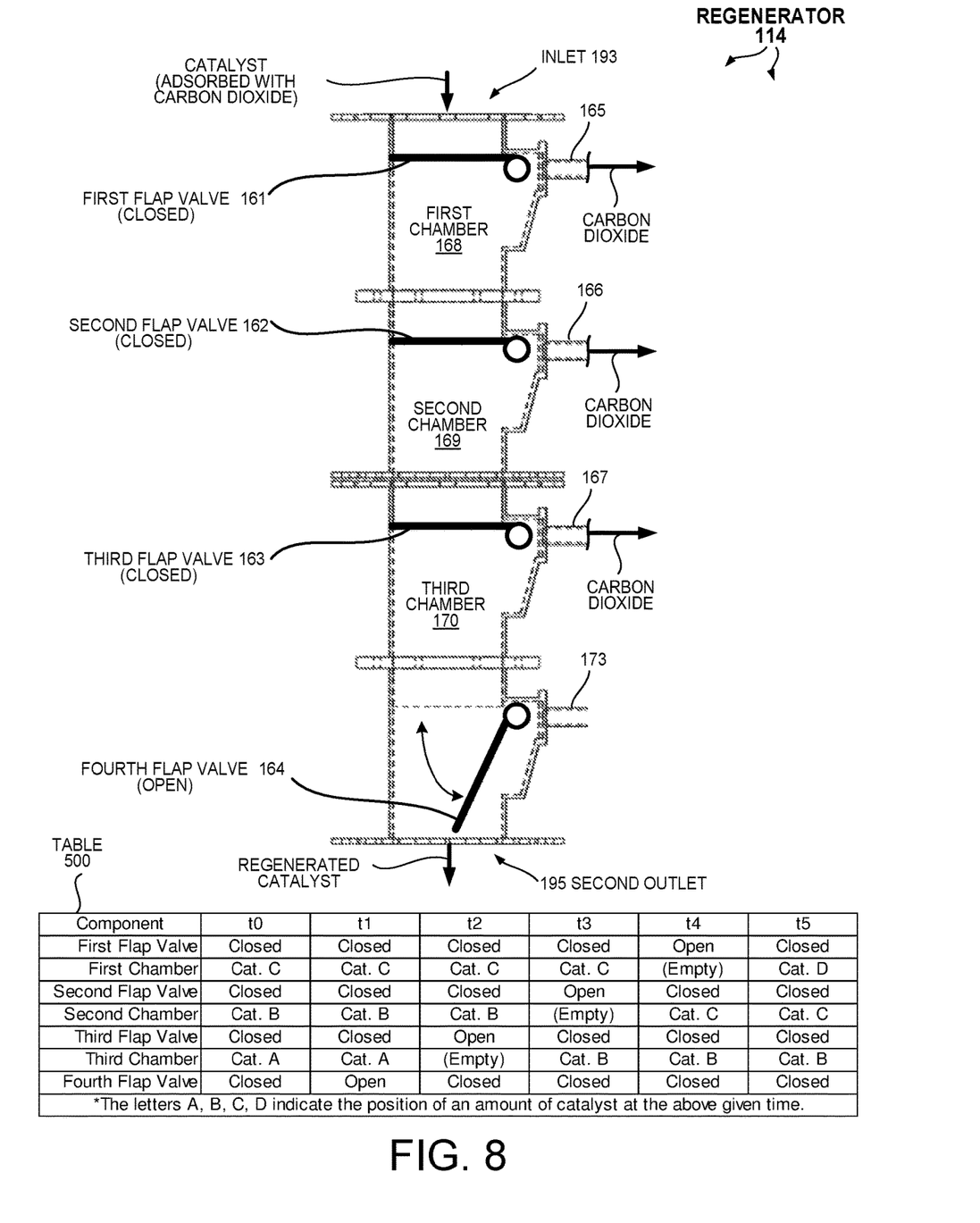
FIG. 8 is a cross-sectional diagram of exemplary regenerator 114 and a corresponding table 500.

FIG. 8 is a cross-sectional diagram of exemplary regenerator 114 and a corresponding table 500. Table 500 illustrates one method of operating the regenerator 114. The regenerator 114 shown in FIG. 8 includes a first flap valve 161, a second flap valve 162, a third flap valve 163, and a fourth flap valve 164. Each of the flap valves 161-164 has an open position and a closed position. For example, FIG. 8 shows valves 161-163 in a closed position and valve 164 in an open position.

A first chamber 168 is formed when valve 161 and valve 162 are each in a closed position. A second chamber 169 is formed when valve 162 and valve 163 are each in a closed position. A third chamber 170 is formed when valve 163 and valve 164 are each in a closed position. Desorption of carbon dioxide from the catalyst occurs in each of chambers 168-170. In the example shown in FIG. 8, each chamber 168, 169, and 170 has a volume that is substantially similar to the amount of catalyst 151 contained in reactor 113.

The vacuum pump 140 draws carbon dioxide via ports 165, 166, and 167, respectively. With the addition of solenoid valves (not shown) a vacuum connection is established between the first pump 140 and ports 165-167. In other words, the first pump 140 operates at vacuum pressure (0<psig). The first pump 140 helps desorb carbon dioxide from the catalyst as it travels through the chambers 168-170. Furthermore, the addition of solenoid valves between the first pump 140 and ports 165-167 allow control of pressure equalization of chambers 168-170.

The opening and closing of valves 161-164 allow catalyst to move through the regenerator 114. The use of multiple flap valves 161-164 and intermediate ports 165-167 allow for more control of the amount of carbon dioxide desorption as well as flowrate of the catalyst moving through the regenerator 114.

In one exemplary operation of the regenerator 114, valves 161-164 continuously alternate from the open position to the closed position in a repeated sequence over a period of time. In this example, at a time, to, valves 161-164 are in the closed position and chambers 168-170 each contain an amount of catalyst.

At time t1, the fourth flap valve 164 opens. Between time t1 and t2, the amount of catalyst (Cat. A) contained in the third chamber 170 exits via the second outlet 194 and the fourth flap valve 164 closes.

At time t2, the third flap valve 163 opens. Between time t2 and t3, the amount of catalyst (Cat. B) contained in the second chamber 169 empties into the third chamber 170 and the third flap valve 163 closes.

At time t3, the second flap valve 162 opens. Between time t3 and t4, the amount of catalyst (Cat. C) contained in the first chamber 168 empties into the second chamber 169 and the second flap valve 162 closes.

At time t4, the first flap valve 161 opens. Between time t4 and t5, the amount of catalyst (Cat. D) enters via the first inlet 193 into the first chamber 168 and the first flap valve 161 closes.

At time t5, one cycle of the repeating valve sequencing is completed. In this example, the valve sequencing of regenerator 114 waits for a predetermined amount of time until flap valves 161-164 are in the closed position before moving to the next sequence. In another example, regenerator 114 utilizes a different sequencing for controlling flap valves 161-164.

Figure 9:
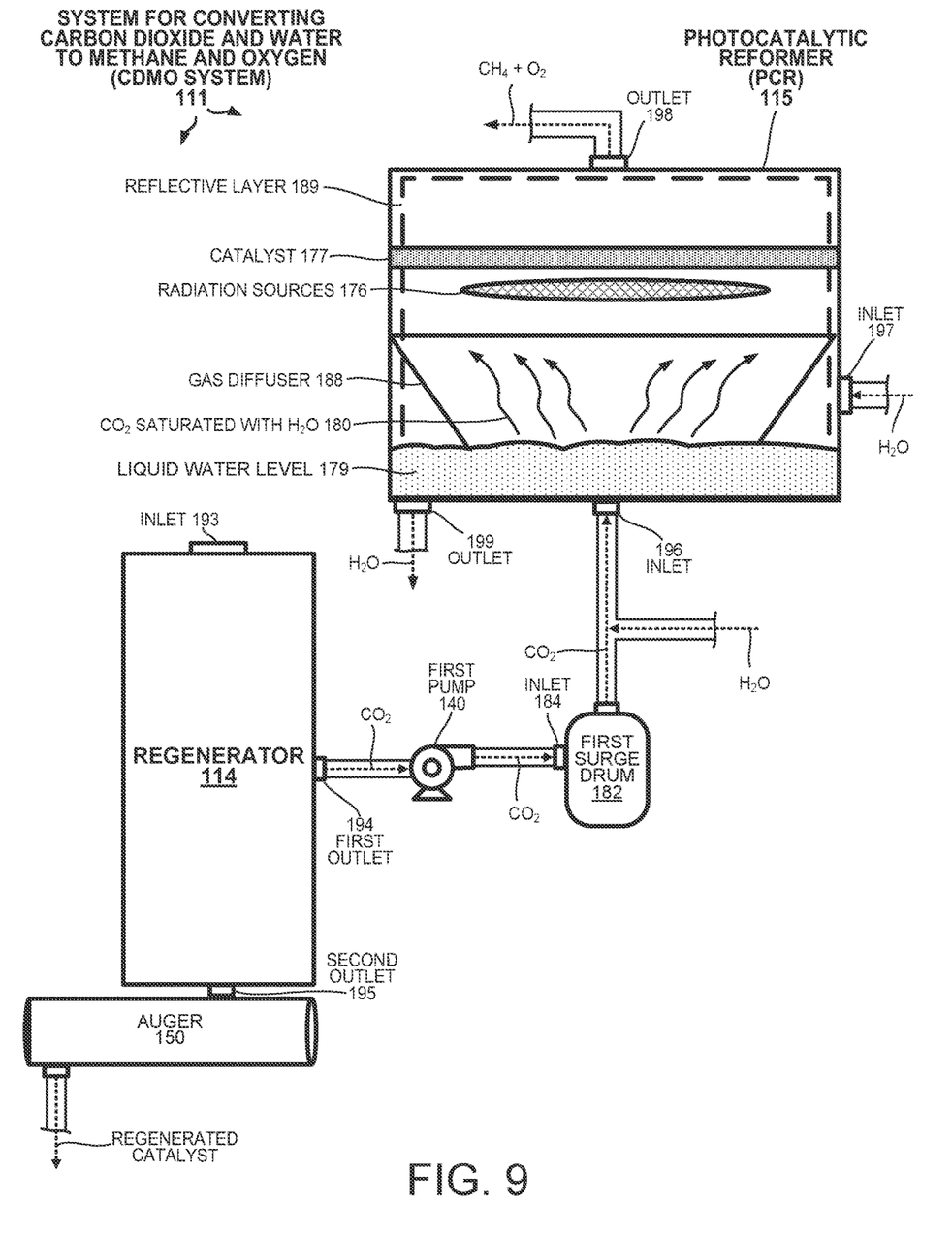
FIG. 9 shows a novel system for converting carbon dioxide to methane and oxygen (CDMO system) 111.

FIG. 9 shows a novel system for converting carbon dioxide to methane and oxygen (CDMO system) 111. The

CDMO system 111 includes the regenerator 114, the first pump 140, and the PCR 115. The CDMO system 111 converts carbon dioxide generated by the regenerator 114 into methane and oxygen using the photocatalytic reformer 115. The CDMO system 111 is a subsystem of the ZEN reforming system 110 but can also be a standalone system. Surge drum 182 is not required when system 111 operates as a standalone system. Notably, the regenerator 114 of the CDMO system 111 can be a state-of-the-art regenerator, the novel regenerator 114 shown in FIGS. 7-8, or another regenerator.

The PCR 115 of FIG. 9 includes at least one inlet (inlets 196 and 197), at least one outlet (outlets 198 and 199), at least one radiation source 176, a catalyst layer 177, a gas diffuser 188, and a reflective layer 189.

In one example, water is fed into inlet 197. As the water fills the PCR 115, a liquid water level 179 forms. Carbon dioxide expelled from the first outlet 194 of the regenerator 114 is received by inlet 196 of the PCR 115. The carbon dioxide travels through the liquid water level 179 and becomes saturated with water 180. Outlet 199 is used to drain unwanted water build up.

In another example, inlet 197 is not required because water is mixed with carbon dioxide and the mixture of carbon dioxide and water enters via inlet 196. The carbon dioxide saturated with water 180 travels through the gas diffuser 180 before reaching the catalyst layer 177.

The main reaction to convert water and carbon dioxide to methane and oxygen occurs within the photocatalytic reformer 115 is as follows:

Reforming Reaction:  $2H_2O+CO_2 \rightarrow CH_4+2O_2$

The scope of the present invention should not be limited to the above-mentioned equation illustrating the conversion of water and carbon dioxide to methane and oxygen. The role of the catalyst is to accept and transfer the electrons between the carbon dioxide and water after they are radiated. The photocatalytic reformer 115 expels a mixture of methane and oxygen via outlet 198.

The at least one radiation source 176 creates incident intensity on a layer of catalyst 177. The reflective layer 189 helps prevent radiation loss.

Figure 10:
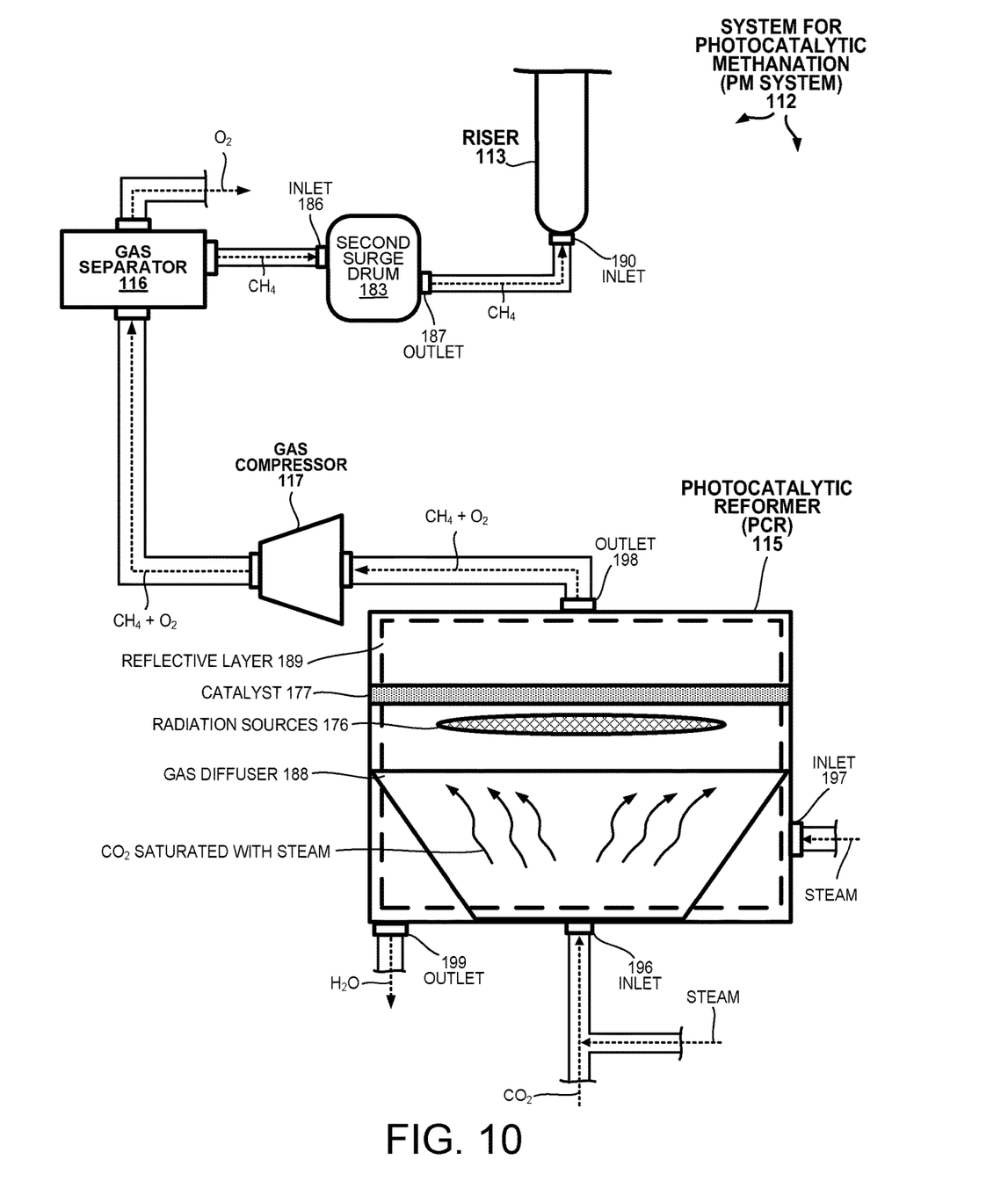
FIG. 10 shows a novel system for photocatalytic methanation (PM system) 112.

FIG. 10 shows a novel system for photocatalytic methanation (PM system) 112. The PM system 112 includes the PCR 115, the gas separator 116, the gas compressor 117, and the reactor 113. In one example, the PCR 115 converts carbon dioxide and water into methane and oxygen. In another example the PCR 115 converts carbon dioxide and steam into methane and oxygen. The methane that is produced by the PCR 115 is recycled back into reactor 113. The PM system 112 is a subsystem of the ZEN reforming system 100 but can also be a standalone system. Surge drum 183 is not required when system 112 operates as a standalone system.

The PCR 115 of FIG. 10 includes at least one inlet (inlets 196 and 197), at least one outlet (outlets 198 and 199), at least one radiation source 176, a catalyst layer 177, a gas diffuser 188, and a reflective layer 189. Outlet 199 is not necessary but may be used to drain any condensation that builds up.

A mixture of steam and carbon dioxide is fed into inlet 196. In another example, steam enters the PCR 115 via inlet 197. The carbon dioxide saturated with steam 180 travels through the gas diffuser 180 before reaching the catalyst layer 177.

The main reaction to convert steam and carbon dioxide to methane and oxygen occurs within the photocatalytic reformer 115 is as follows:

Reforming Reaction: $2H_2O+CO_2 \rightarrow CH_4+2O_2$

The scope of the present invention should not be limited to the above-mentioned equation illustrating the conversion of steam and carbon dioxide to methane and oxygen. The role of the catalyst is to accept and transfer the electrons between the carbon dioxide and steam after they are radiated. The photocatalytic reformer 115 expels a mixture of methane and oxygen via outlet 198 of the photocatalytic reformer 115.

The at least one radiation source 176 creates incident intensity on the catalyst layer 177. The reflective layer 189 helps prevent radiation loss.

Figure 11:
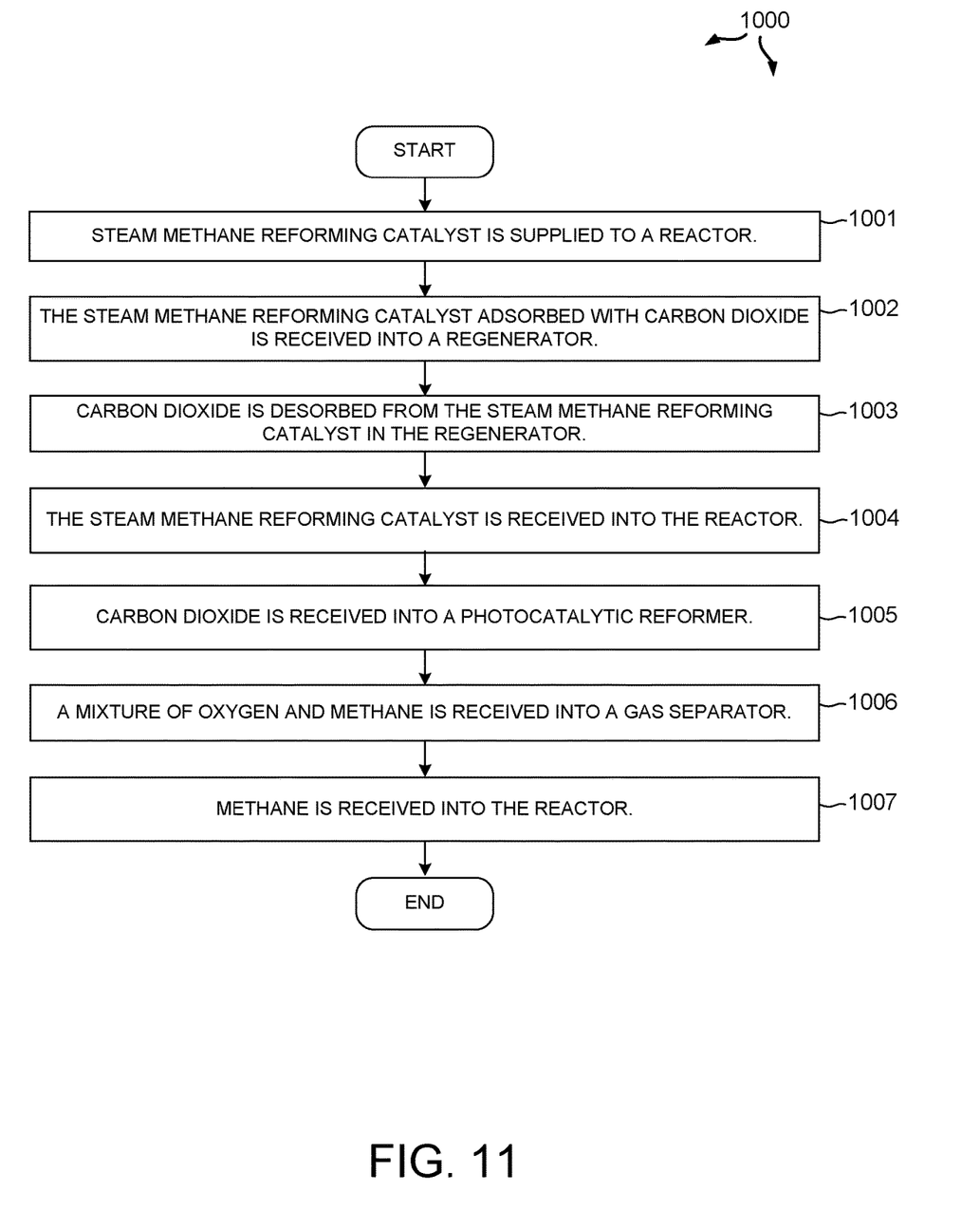
FIG. 11 is a flowchart of a method 1000 in accordance with one novel aspect.

FIG. 11 is a flowchart of a method 1000 in accordance with one novel aspect. In a first step (step 1001), steam methane reforming catalyst is supplied to a reactor. In a second step (step 1002), steam methane reforming catalyst adsorbed with carbon dioxide is received into a regenerator. In a third step (step 1003), carbon dioxide is desorbed from the steam methane reforming catalyst in the regenerator. In a fourth step (step 1004), the steam methane reforming catalyst is received into the reactor. In a fifth step (step 1005), carbon dioxide is received into a photocatalytic reformer. In a sixth step (step 1006), a mixture of oxygen and methane is received into a gas separator. In a seventh step (step 1007), methane is received into the reactor.

Although certain specific embodiments are described above for instructional purposes, the teachings of this patent document have general applicability and are not limited to the specific embodiments described above. For example, other hydrocarbons can be used instead of methane. Accordingly, various modifications, adaptations, and combinations of various features of the described embodiments can be practiced without departing from the scope of the invention as set forth in the claims.

What is claimed is:

1. A system comprising:
a reactor comprising an inlet and an outlet, wherein the reactor contains an amount of catalyst, wherein the amount of catalyst is absorbed with carbon dioxide, and wherein when steam is injected via the inlet pushes the catalyst out of the outlet;
a regenerator having an inlet, a first outlet and a second outlet, wherein the regenerator is fed the amount of catalyst absorbed with carbon dioxide via the inlet, wherein carbon dioxide is desorbed from the amount of catalyst absorbed with carbon dioxide within the regenerator, wherein carbon dioxide exits via the first outlet, and wherein the amount of catalyst which is not absorbed with carbon dioxide exits via the second outlet;
a first pump having an inlet and an outlet, wherein the first pump is configured to assist in the desorption of the carbon dioxide from the amount of catalyst absorbed with carbon dioxide in the regenerator by drawing the desorbed carbon dioxide from the first outlet of the regenerator via the inlet, and wherein the first pump is configured to output carbon dioxide via the outlet; and
a photocatalytic reformer having a radiation source, at least one inlet and at least one outlet, wherein the photocatalytic reformer contains an amount of photocatalyst, wherein the photocatalytic reformer is configured to receive carbon dioxide output by the regenerator via the at least one inlet, wherein the reformer is configured to output methane and oxygen via the at least one outlet, and wherein the reactor receives at least some of the methane output by the photoactivity reformer.

2. The system of claim 1, wherein the reactor is configured to receive a gas mixture via the inlet, and wherein the reactor is configured to output hydrogen and catalyst adsorbed with carbon dioxide via the outlet.

3. The system of claim 2, wherein the gas mixture is selected from a group consisting of: methane, steam, and hydrogen.

4. The system of claim 1, wherein the regenerator is configured to receive the catalyst adsorbed with carbon dioxide from the outlet of the reactor via the inlet of the regenerator, wherein the regenerator is configured to output carbon dioxide via the first outlet and wherein the regenerator is configured to output desorbed catalyst via the second outlet.

5. The system of claim 1, further comprising:
a gas separator having an inlet, a first outlet and a second outlet, wherein the gas separator is configured to receive a mixture of methane and oxygen output by the photocatalytic reformer via the inlet, and wherein the gas separator is configured to output methane via the first outlet and oxygen via the second outlet.

6. The system of claim 1, further comprising:
a gas compressor having an inlet and an outlet, wherein the gas compressor is configured to receive methane output by the photocatalytic reformer via the inlet, and wherein the gas compressor expels methane via the outlet.

7. The system of claim 1, further comprising:
a first surge drum having an inlet and an outlet, wherein the first surge drum is configured to receive carbon dioxide from the regenerator via the inlet, and wherein the first surge drum is configured to output carbon dioxide via the outlet; and
a second surge drum having an inlet and an outlet, wherein the second surge drum is configured to receive methane output by the gas separator via the inlet, and wherein the first surge drum is configured to output methane via the outlet.

8. The system of claim 1, wherein the system includes a sulfur absorber having an inlet and an outlet, wherein the sulfur absorber is configured to desulfurize methane received via the inlet, and wherein the sulfur absorber is configured to output desulfurized methane via the outlet.

9. The system of claim 1, wherein the system includes at least one heating vessel, wherein the at least one heating vessel intakes water, and wherein the at least one heating vessel outputs steam.

10. The system of claim 9, wherein the system includes a water tank and a second pump, wherein the water tank contains water, wherein the second pump propels water from the water tank to be fed to the at least one heating vessel, and wherein photocatalytic reformer receives some of the water from the water tank.

11. The system of claim 9, wherein the photocatalytic reformer receives at least some of the steam output by the at least one heating vessel via the at least one inlet of the photocatalytic reformer.

12. The system of claim 1, wherein methane from outside of the system is received into the inlet of the reactor.

13. The system of claim 1, wherein the catalyst adsorbs at least some of the carbon dioxide contained within the reactor.

14. A system comprising:
a regenerator vessel having an outlet and a first pump, wherein the first pump assists in the desorption of carbon dioxide from a steam methane reforming catalyst that is absorbed with carbon dioxide within the regenerator, and wherein the first pump extracts the carbon dioxide via the outlet of the regenerator; and
a photocatalytic reformer having at least one inlet and an outlet, a radiation source, and an amount of photocatalyst, wherein the reformer is designed to receive carbon dioxide expelled by the regenerator vessel via the inlet, and wherein the reformer is designed to expel methane and oxygen via the outlet.

15. The system of claim 14, wherein the reformer is configured to receive water via the at least one inlet.

* * * * *